(12) United States Patent
Muscariello et al.

(10) Patent No.: US 11,095,751 B2
(45) Date of Patent: Aug. 17, 2021

(54) IN-NETWORK CONTENT CACHING EXPLOITING VARIATION IN MOBILITY-PREDICTION ACCURACY

(71) Applicant: Cisco Technology, Inc., San Jose, CA (US)

(72) Inventors: Luca Muscariello, Paris (FR); Giovanna Carofiglio, Paris (FR); Michele Papalini, Issy les Moulineaux (FR); Mauro Sardara, Paris (FR)

(73) Assignee: CISCO TECHNOLOGY, INC., San Jose, CA (US)

( * ) Notice: Subject to any disclaimer, the term of this patent is extended or adjusted under 35 U.S.C. 154(b) by 182 days.

(21) Appl. No.: 16/044,722

(22) Filed: Jul. 25, 2018

(65) Prior Publication Data
US 2020/0036814 A1 Jan. 30, 2020

(51) Int. Cl.
*H04L 29/08* (2006.01)
*H04L 29/06* (2006.01)

(52) U.S. Cl.
CPC .......... *H04L 67/322* (2013.01); *H04L 65/102* (2013.01); *H04L 65/80* (2013.01); *H04L 67/2842* (2013.01)

(58) Field of Classification Search
CPC ... H04L 67/322; H04L 67/2842; H04L 67/18; H04L 67/303; H04L 67/2852; H04L 67/2885; H04L 67/28; H04L 65/80; H04L 65/102
See application file for complete search history.

(56) References Cited

U.S. PATENT DOCUMENTS

| | | | | |
|---|---|---|---|---|
| 6,243,755 | B1 * | 6/2001 | Takagi | H04L 29/06 709/201 |
| 8,516,114 | B2 * | 8/2013 | Banavar | H04L 29/06 709/225 |
| 9,405,553 | B2 * | 8/2016 | Branson | G06F 9/505 |
| 9,531,522 | B2 * | 12/2016 | El Gamal | H04L 5/0064 |
| 9,967,361 | B2 | 5/2018 | Velummylum et al. | |
| 2017/0195447 | A1 * | 7/2017 | Panagos | H04L 67/2814 |
| 2018/0176325 | A1 * | 6/2018 | Liang | H04L 67/02 |
| 2019/0081802 | A1 * | 3/2019 | Ying | H04W 12/069 |

OTHER PUBLICATIONS

International Search Report and Written Opinion in counterpart International Application No. PCT/US2019/042313, dated Sep. 30, 2019, 13 pages.

(Continued)

*Primary Examiner* — Uzma Alam

(57) ABSTRACT

A network device in a network edge receives content directed to a mobile device attached to the network edge from an upstream network device and forwards the content toward the mobile device. The network device makes a decision whether to cache the content based at least in part on a popularity of the content in a region covered by the network device and a prediction error for an estimated probability that the mobile device will transition from the region to another region. The popularity is directly correlated with a first bias toward caching the content. The prediction error is inversely correlated with a second bias toward caching the content. The decision is implemented: the network device either caches the content or foregoes caching the content, in accordance with the decision.

20 Claims, 3 Drawing Sheets

(56) References Cited

OTHER PUBLICATIONS

3GPP Organizational Partners, "3rd Generation Partnership Project; Technical Specification Group Services and System Aspects; System Architecture for the 5G System; Stage 2 (Release 15)", 3GPP TS 23.501 V15.2.0., Jun. 2018, 217 pages.
Abou-Zeid. "Predictive Radio Access Networks for Vehicular Content Delivery", Queen's University, Kingston, Ontario, Canada, Apr. 2014, pp. 1-184.
Malandrino, "Content Download in Vehicular Networks in Presence of Noisy Mobility Prediction", IEEE Transactions on Mobile Computing, vol. 13, No. 5, May 2004, pp. 1-15.
Vigneri, "Per Chunk Caching for Video Streaming from a Vehicular Cloud", CHANTS 2017-ACM MobiCom Workshop on Challenged Networks, Oct. 2017, Snowbird, Utah, USA, pp. 1.
Zhang, "EdgeBuffer: Caching and Prefetching Content at the Edge in the Mobility First Future Internet Architecture", WINLAB, Rutgers University, North Brunswick, NJ, pp. 1-7.

\* cited by examiner

IN-NETWORK CONTENT CACHING EXPLOITING VARIATION IN MOBILITY-PREDICTION ACCURACY

TECHNICAL FIELD

The present disclosure generally relates to caching content in a network, and in particular, to deciding whether to cache content based at least in part on a prediction error for estimated mobility of a device requesting the content.

BACKGROUND

Distribution of content from the cloud to mobile devices is increasingly more prevalent. For example, over-the-air (OTA) software updates are provided to vehicles, media is provided to user devices in vehicles, and mobile Internet-of-Things (IoT) applications consume increasing amounts of content. Distributing such content with low latency to a large number of mobile devices, some of which may have complicated mobility patterns or no pattern to their movement, presents significant challenges.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
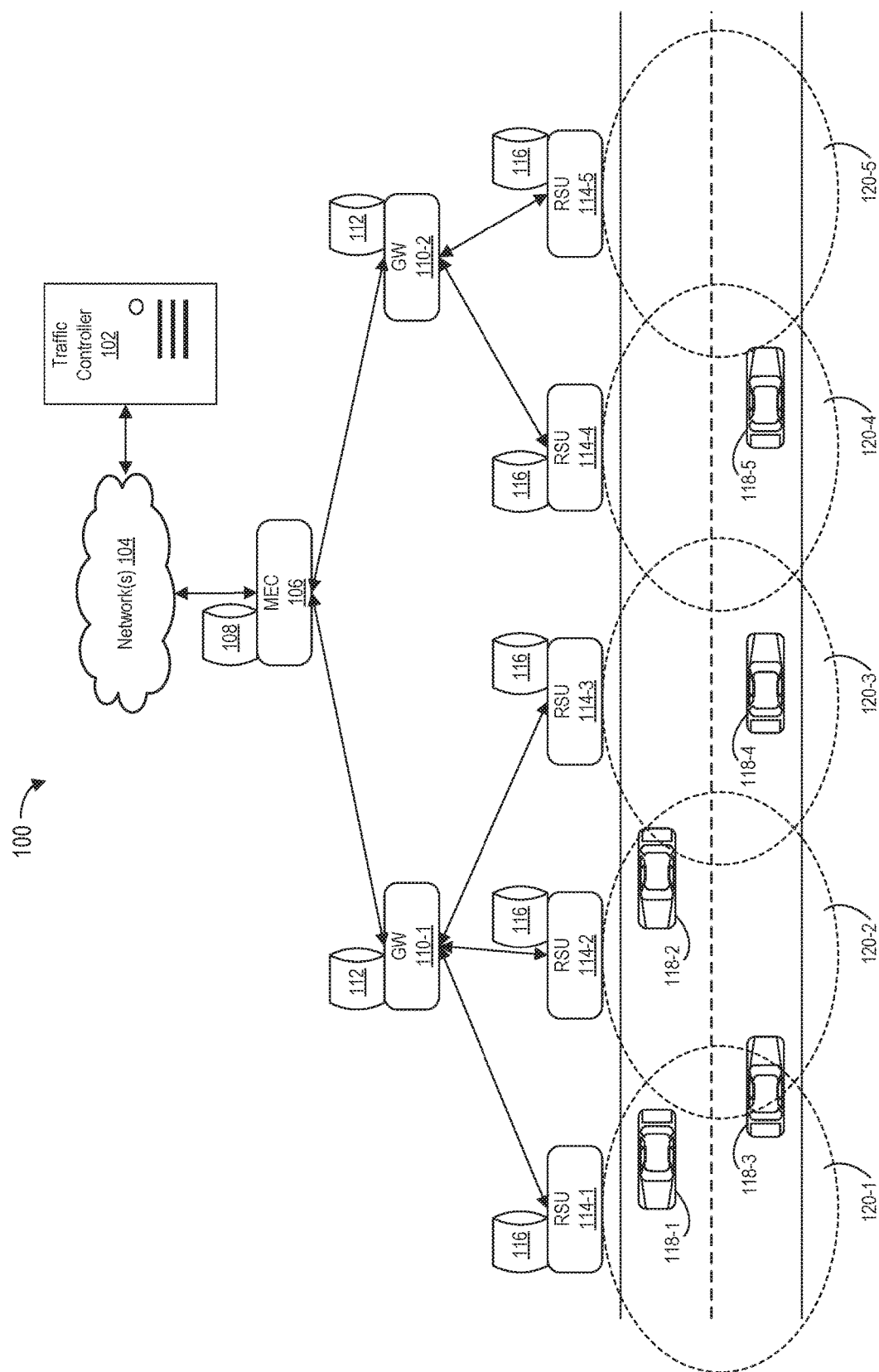
FIG. 1 is a block diagram illustrating a network architecture in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION OF EXAMPLE EMBODIMENTS

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

Overview

Various implementations disclosed herein enable a network device in a network edge intelligently to decide whether to cache content for mobile devices, to allow the content to be delivered with low latency while making judicious use of available memory. For example, a networking method is performed by a network device in a network edge. The network device includes one or more processors and memory (e.g., non-transitory memory) storing instructions for execution by the one or more processors. In the method, content directed to a mobile device attached to the network edge is received from an upstream network device and is forwarded toward the mobile device. A decision is made whether to cache the content at the network device based at least in part on a popularity of the content in a region covered by the network device and a prediction error for an estimated probability that the mobile device will transition from the region to another region. The popularity is directly correlated with a first bias toward caching the content. The prediction error is inversely correlated with a second bias toward caching the content. The decision is implemented: the network device either caches the content or foregoes caching the content, in accordance with the decision.

FIG. 1 is a block diagram illustrating a network architecture 100 in accordance with some implementations. The network architecture 100 includes a three-tiered network edge. The first tier includes a plurality of access points to which mobile devices attach. In the example of FIG. 1, the access points are road-side units (RSUs) 114-1 through 114-5 and the mobile devices are vehicles (or electronic devices in vehicles) 118-1 through 118-5, although the access points and mobile devices are not so limited. The second tier includes a plurality of gateways (GWs) 110 upstream from respective RSUs 114. A first gateway 110-1 is upstream from, and communicates with, RSUs 114-1 through 114-3. A second gateway 110-2 is upstream from, and communicates with, RSUs 114-4 and 114-5. The third tier includes a server 106 that is upstream from, and communicates with, the gateways 110-1 and 110-2. In the example of FIG. 1, the server 106 is a mobile-edge-computing (MEC) server, although the server 106 is not so limited.

Each of the RSUs 114 provides wireless network access to, and thus serves as an access point for, vehicles 118 (or, more generally, respective mobile devices) in respective regions 120. The RSU 114-1 provides wireless access to a vehicle 118-1 in a region 120-1, the RSU 114-3 provides wireless access to a vehicle 118-4 in a region 120-3, and so on. A vehicle 118 (or, more generally, a mobile device) is said to be attached to the RSU 114 that it uses for wireless network access. A vehicle 118 may attach to an RSU 114 by forming a wireless connection with the RSU 114 (e.g., upon entering a corresponding region 120, or after being turned on within a region 120). A vehicle 118 may transition from a first region 120 to a second region 120; the vehicle 118 drops its attachment to a corresponding first RSU 114 and attaches to a second RSU 114 accordingly. In the example of FIG. 1, the vehicle 118-3 is transitioning from the first region 120-1 to the second region 120-2. The vehicle 118-3 will thus drop its attachment to the RSU 114-1 and will attach to the RSU 114-2.

All or a portion of the network devices in the network edge include memory for caching content. (The term "caching" as used herein refers to storing content locally at a particular device and does not imply that the content is stored in any particular type of memory.) In some implementations, the network devices implement information-centric networking (ICN) or hybrid ICN, and content requests from mobile devices are ICN/hICN interests. In the example of FIG. 1, the RSUs 114 include respective memories 116, the gateways 110 include respective memories 112, and the server 106 includes memory 108. If a network device receives a request, originating from a vehicle 118, for content that is locally cached, the network device can respond to the request by transmitting the requested content downstream toward the requesting vehicle 118, without passing the request further upstream. For example, the vehicle 118-1 transmits a request for content to the RSU 114-1. If the RSU 114-1 has the requested content cached in its memory 116, it responds by transmitting the content to the vehicle 118-1. Otherwise, the RSU 114-1 forwards the request upstream to the gateway 110-1. If the gateway 110-1 has the requested content cached in its memory 116, it responds by transmitting the content downstream to the RSU 114-1, and thus toward the vehicle 118-1. Otherwise, the gateway 110-1 forwards the request upstream to the server 106. If the server 106 1 has the requested content cached in its memory 108, it responds by transmitting the content downstream to the gateway 110-1, and thus toward the vehicle 118-1. Otherwise, the server 106 forwards the request through one or more networks 104 to a remote device (e.g., server) with the content (e.g., the server 106 goes out to the cloud to obtain the content). Caching content in the memories 116, 112, and/or 108 results in low latency for responding to content requests and also reduces network traffic by limiting the path taken by content requests. However, because the size of the memories 116, 112, and 108 is of course limited, decisions regarding whether to cache particular content items should be made intelligently.

In some implementations, a traffic controller 102 monitors the mobile devices and predicts future movement of the mobile devices (e.g., using a Markovian predictor with a fixed history length H). The traffic controller 102 estimates the probabilities that a mobile device will transition from a given region 120 to other regions 120, and thus from attachment to a given RSU 114 to other RSUs 114. The traffic controller 120 also calculates prediction errors for respective probabilities. For example, for a particular mobile device (e.g., vehicle 118), the traffic controller generates a set of transition probabilities in an array P with a prediction error E. In some implementations, the prediction error is based at least in part on the presence or absence of a historical pattern of movement for the mobile device. For example, a vehicle 118 may have a low prediction error on weekdays, when it follows the same commute, but may have a high prediction error on weekends, when it does not follow a set pattern. The traffic controller 102 may estimate these transition probabilities and calculate these errors for all mobile devices (e.g., all vehicles 118) at the network edge.

The traffic controller 102 provides the transition probabilities and errors to the server 106, gateways 110, and/or RSUs 114 of the network edge. In some implementations, the traffic controller 102 is communicatively coupled to the network edge through one or more networks 104 (e.g., the Internet, other wide-area networks (WANs), metropolitan-area networks (MAN), etc.), and transmits the transition probabilities and errors to the network devices of the network edge through the one or more networks 104. The traffic controller 102 thus may be situated outside of the network edge (e.g., implemented in the cloud). Alternatively, the traffic controller 102 may be instantiated in a network device in the network edge (e.g., in the server 106).

Figure 2:
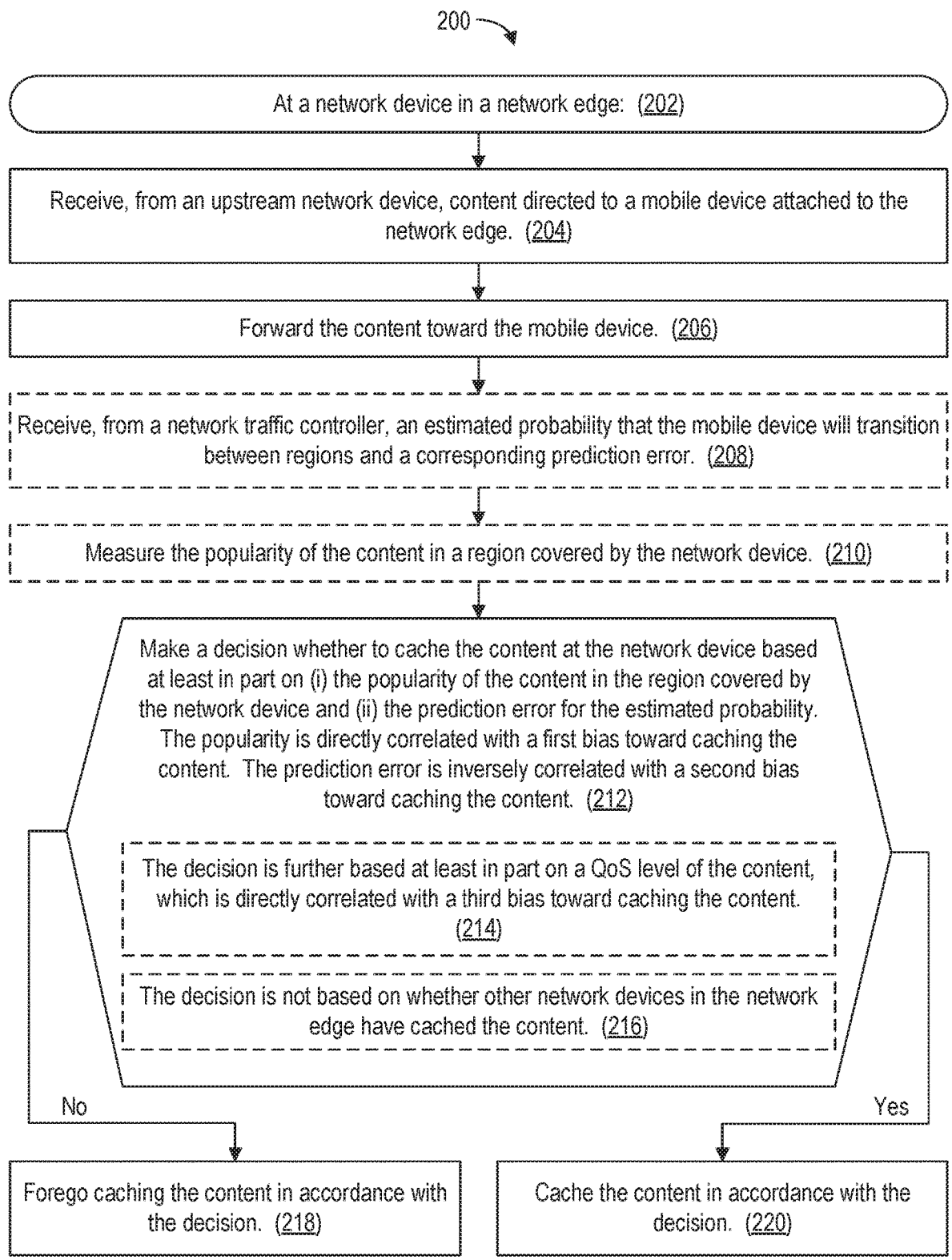
FIG. 2 shows a flowchart illustrating a networking method in accordance with some implementations.

FIG. 2 shows a flowchart illustrating a networking method 200 in accordance with some implementations. The method 200 is performed (202) by a network device in the network edge (e.g., an RSU 114 or other access point, a gateway 110, or the server 106). In some implementations, respective instances of the method 200 are performed repeatedly by all or a portion of the network devices in the network edge.

In the method 200, content directed to a mobile device attached to the network edge is received (204) from an upstream network device. In some implementations, the mobile device is an electronic device in a vehicle 118 (e.g., a mobile device that is part of the vehicle 118 or that is in the vehicle 118). The content is forwarded (206) toward the mobile device. The content may be received (204) in response to a request for the content that the network device (or another network device) previously received from the mobile device and forwarded to the upstream device (or another upstream device).

In some implementations, an estimated probability that the mobile device will transition between regions and/or a corresponding prediction error are received (208) from the traffic controller 102, as discussed above.

In some implementations, the popularity of the content in a region covered by the network device is measured (210). If the network device is an RSU 114 or other access point, this region is the corresponding region 120. If the network device is a gateway 110 or server 106, this region is the set of regions 120 for all downstream access points. To measure the popularity, the network device may count requests for the content received by the network device (e.g., requests originating from mobile devices) and/or instances of the content received by the network device (e.g., instances of the content being transmitted downstream in response to requests from mobile devices). The network device may use counters 316 (FIG. 3) to keep these counts. The network device may perform sampling to reduce the amount of data to be stored to determine the popularity. For example, the network device samples content-item requests received at the network device and counts sampled content-item requests that are requests for the content. Alternatively, or in addition, the network device samples content items received at the network device and counts sampled content items that are instances of the content.

A decision is made (212) whether to cache the content at the network device based at least in part on (i) the popularity of the content in the region covered by the network device and (ii) the prediction error for the estimated probability. The popularity is directly correlated with a first bias toward caching the content: the higher the popularity, the more likely the network device is to cache the content. The prediction error is inversely correlated with a second bias toward caching the content: the lower the prediction error, the more likely the network device is to cache the content.

The second bias may be a function of the tier of the network edge in which the network device performing the method 200 is situated. For example, if the network device is an access point (e.g., RSU 114) to which the mobile device is attached, then the second bias has a magnitude such that, for a given prediction error, the network device is less likely to decide to cache the content than is a respective gateway 110 upstream of the access point. If the network device is a gateway 110 upstream of the access point (e.g., RSU 114) to which the mobile device is attached, then the second bias has a magnitude such that, for a given prediction error, the network device is more likely to decide to cache the content than is the downstream access point. Everything else being equal, a gateway 110 is thus more likely to cache content for a mobile device with a high prediction error than is an access point, in accordance with some implementations. That is, a gateway 110 is more tolerant of prediction error than an access point in deciding to cache content, because a mobile device with high prediction error is more likely to stay within the set of regions 120 covered by the gateway 110 than within the single region 120 covered by the access point. Content cached at the gateway 110 is thus more likely to be re-used than content cached at the access point. While the access point offers lower latency than the gateway 110, a high prediction error suggests that caching the content at the access point may be wasteful of memory.

Similarly, if the network device is a gateway 110 upstream from an access point (e.g., RSU 114) to which the mobile device is attached, then the second bias has a magnitude such that, for a given prediction error, the network device is less likely to decide to cache the content than is the upstream server 106. If the network device is the server 106, which is upstream of the gateway 110 for the access point to which the mobile device is attached, then the second bias has a magnitude such that, for a given prediction error, the network device is more likely to decide to cache the content than is the downstream gateway 110. Everything else being equal, the server 106 is thus more likely to cache content for a mobile device with a high prediction error than is a gateway 110, in accordance with some implementations.

In some implementations, the decision is further based (214) at least in part on a QoS level of the content. The QoS level is directly correlated with a third bias toward caching the content. A higher QoS level indicates a higher desired or guaranteed quality of service. Caching content helps to ensure that the quality of service is met. The bias toward caching for high QoS levels reflects this fact and helps to ensure low latency for providing content with a high QoS. In one example, OTA updates to vehicular software are assigned a high QoS to ensure that the updates are rolled out promptly. The high QoS for these updates may result from safety issues that the updates address or from a premium paid by vehicle owners.

In some implementations, the decision is not based (216) on whether other network devices in the network edge have cached the content. For example, the network device does not receive communications indicating whether the other network devices in the network edge have cached the content. Various network devices in the network edge thus decide whether to cache content independently of each other. Network traffic is therefore reduced, because network devices do not message each other regarding whether or not they have cached particular content.

In some implementations, to make the decision, a utility function is calculated that accounts for the first bias, the second bias, and any other biases relevant to the decision (e.g., the third bias relating to QoS). A determination is made as to whether the utility function satisfies (e.g., exceeds, or equals or exceeds) a threshold. If the threshold is satisfied, the decision is to cache the content. If the threshold is not satisfied, the decision is to forego caching the content.

One example of a utility function that may be used to make the decision is:

$$U(x) = \Sigma_{i=1}^{n} U_i(x_i) \quad (1)$$

where n is the total number of biases (i.e., factors) relevant to the decision, i indexes the biases, $x_i$ is a suitably weighted (e.g., normalized) value of the bias i, and $U_i(x_i)$ is a function that indicates the degree of utility for $x_i$. For example, $$U_i(x) = \frac{x^{\Lambda-\alpha}}{\Lambda-\alpha} \quad (2)$$

where $\Lambda$ and $\alpha$ are constants, and $\alpha \geq 1$. In another example, $$U_i(x) = \log x \quad (3).$$

The decision is implemented: the network device either caches (220) the content or foregoes caching (218) the content, in accordance with the decision. In some implementations, cached content is stored in the memory 116, 112, or 108 of the network device. If the memory space allocated for caching content is full, then content that was previously cached at the network device is evicted to make room for caching the new content. In some implementations, a least-recently-used (LRU) algorithm is used to determine the content to evict. For example, a k-LRU algorithm is used, in which the LRU content is evicted in favor of content that has been counted (or samples of which have been counted) at least k times, where k is an integer. The decision of step 212 thus may include a determination as to whether the k-times threshold has been satisfied. In other implementations, other eviction algorithms are used. For example, a least-frequently-used (LFU) algorithm is used, in which the network device maintains counts for how many times respective cached content items are received or requested and evicts the least-frequently-used content.

Steps in the method 200 may be combined or broken out and the sequence of the method 200 may be modified for steps that are not order-dependent. For example, the order of the steps 206, 208, and/or 210 may be varied (e.g., performance of the steps 206, 208, and/or 210 may overlap). Also, the decision-making of step 212 and/or caching of step 220 may be performed before, during, and/or after the forwarding of step 206.

The method 200 thus allows network devices in the network edge to make intelligent decisions regarding whether or not to cache content. The network devices are able to balance popularity with the prediction error for mobility estimations, such that low latency for providing content is achieved without wasting memory.

Figure 3:
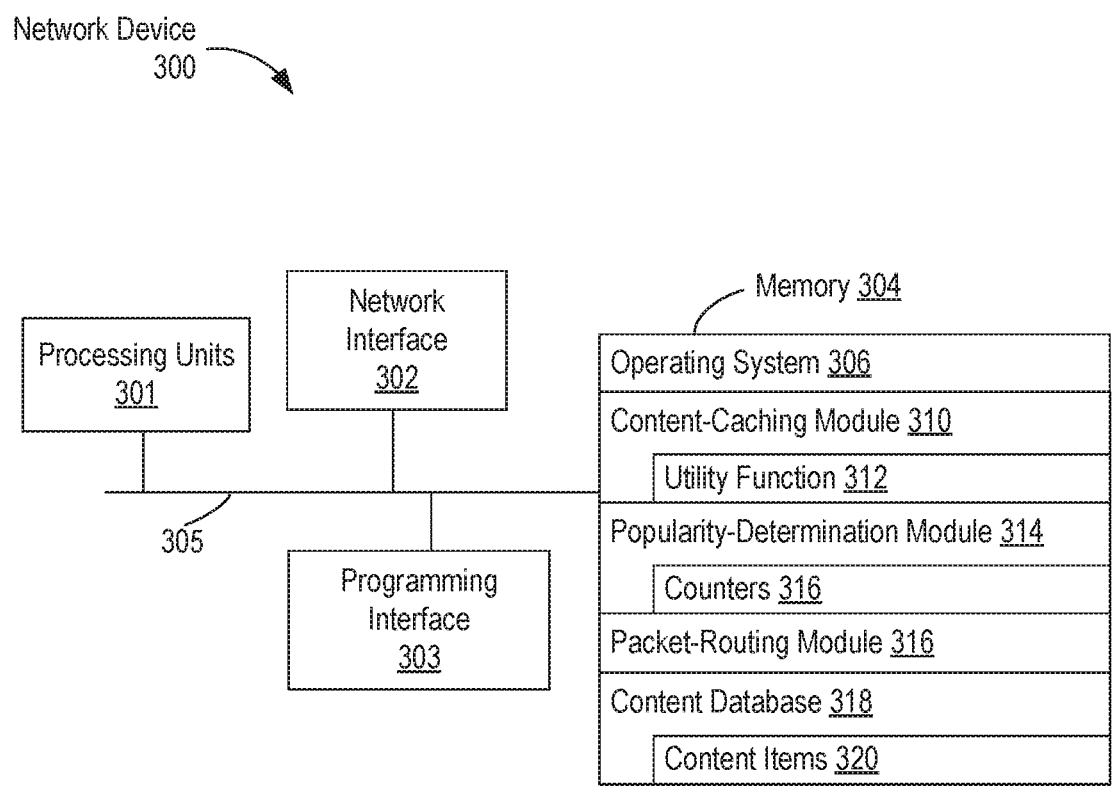
FIG. 3 is a block diagram of a network device in accordance with some implementations.

FIG. 3 is a block diagram of a network device 300 according to some implementations. The network device 300 is an example of the network device that performs the method 200 (FIG. 2). For example, the network device may be an RSU 114 or other access point, a gateway 110, or the server 106. While certain features are illustrated, those of ordinary skill in the art will appreciate from the present disclosure that various other features have not been illustrated for the sake of brevity, and so as not to obscure more pertinent aspects of the implementations disclosed herein. To that end, in some implementations the network device 300 includes one or more processing units (e.g., CPUs, network processors, etc.) 301, a network interface 302, a programming interface 303, memory 304, and one or more communication buses 305 for interconnecting these and various other components.

In some implementations, the memory 304 or a non-transitory computer-readable storage medium of the memory 304 stores the following programs, modules, and data structures, or a subset thereof: an optional operating system 306, content-caching module 310, popularity-determination module 314, packet-routing module 316, and database 318. The operating system 306 includes procedures for handling various basic system services and for performing hardware-dependent tasks. The content-caching module 310 may include instructions for calculating a utility function 312 (e.g., per equations 1, 2, and/or 3). The popularity-determination module 314 may include counters 316 for measuring the popularity of content items. The content database 318, which caches content items 320, may be an example of memory 108, 112, or 116 (FIG. 1). The memory 304 or a non-transitory computer-readable storage medium of the memory 304 thus may include instructions for performing the method 200 (FIG. 2).

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first bias could be termed a second bias, and, similarly, a second bias could be termed a first bias, without changing the meaning of the description, so long as all occurrences of the first bias are renamed consistently and all occurrences of the second bias are renamed consistently. The first bias and the second bias are both biases, but they are not the same bias.

The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A networking method, comprising,
at a network device in a network edge, the network device comprising one or more processors and memory storing instructions for execution by the one or more processors:
receiving, from an upstream network device, content directed to a mobile device attached to the network edge;
making a decision whether to cache the content at the network device based at least in part on a popularity of the content in a region covered by the network device and a prediction error for an estimated probability that the mobile device will transition from the region to another region, wherein the popularity is directly correlated with a first bias toward caching the content and the prediction error for the estimated probability that the mobile device will transition from the region to another region is inversely correlated with a second bias toward caching the content in which a lower prediction error for the estimated probability that the mobile device will transition from the region to another region increases a likelihood toward caching the content; and
implementing the decision, comprising either caching or foregoing caching the content at the network device in accordance with the decision such that for the network device serving as a gateway upstream from an access point, the second bias has a magnitude that causes, for a given prediction error, the network device to more likely decide to cache the content than for the access point to cache the content.

2. The method of claim 1, wherein the decision whether to cache the content at the network device is not based at least in part on whether other network devices in the network edge have cached the content.

3. The method of claim 2, wherein the network device does not receive communications indicating whether the other network devices in the network edge have cached the content.

4. The method of claim 1, wherein the decision whether to cache the content at the network device is further based at least in part on a quality-of-service (QoS) level of the content, wherein the QoS level is directly correlated with a third bias toward caching the content.

5. The method of claim 1, wherein making the decision whether to cache the content at the network device comprises:
calculating a utility function that accounts for the first bias and the second bias; and
determining whether the utility function satisfies a threshold.

6. The method of claim 1, wherein the network edge comprises a plurality of tiers of network devices, the plurality of tiers of network devices comprising:
a first tier of access points;
a second tier of gateways upstream from respective access points of the first tier; and
a third tier comprising a server upstream from respective gateways of the second tier,
wherein the network device is selected from the group consisting of the access points of the first tier, the gateways of the second tier, and the server of the third tier.

7. The method of claim 6, wherein:
the mobile device is an electronic device in a vehicle;
the access points of the first tier comprise road-side units (RSUs); and
the server of the third tier is a mobile-edge-computing (MEC) server.

8. The method of claim 6, wherein:
for the network device serving as an access point of the first tier and the mobile device is attached to the access point, the second bias has a magnitude that causes, for a given prediction error, the network device to less likely to decide to cache the content than for a respective gateway upstream of the access point to decide to cache the content.

9. The method of claim 1, further comprising, at the network device, measuring the popularity of the content.

10. The method of claim 9, wherein measuring the popularity comprises counting at least one of requests for the content received by the network device or instances of the content received by the network device.

11. The method of claim 9, wherein measuring the popularity comprises:
   sampling content-item requests or content items received at the network device; and
   counting sampled content-item requests that are requests for the content or counting sampled content items that are instances of the content.

12. The method of claim 1, further comprising, at the network device, receiving the estimated probability and the prediction error from a network traffic controller, wherein the network traffic controller is situated outside of the network edge.

13. The method of claim 1, wherein the prediction error is based at least in part on a presence or an absence of a historical pattern of movement for the mobile device.

14. The method of claim 1, further comprising, at the network device, before receiving the content from the upstream network device:
   receiving a request for the content from the mobile device; and
   forwarding the request to the upstream network device, wherein the content is received in response to the request.

15. The method of claim 1, further comprising:
   forwarding the content toward the mobile device.

16. The method of claim 15, wherein the receiving and the forwarding are based on a request from the mobile device for the content.

17. The method of claim 1, wherein the network edge comprises a plurality of tiers of network devices and the second bias is a function of a tier of the network edge in which the network device is situated.

18. A network device for deployment in a network edge, comprising:
   one or more processors; and
   memory storing one or more programs for execution by the one or more processors, the one or more programs including instructions for:
      receiving, from an upstream network device, content directed to a mobile device attached to the network edge;
      making a decision whether to cache the content based at least in part on a popularity of the content in a region covered by the network device and a prediction error for an estimated probability that the mobile device will transition from the region to another region, wherein the popularity is directly correlated with a first bias toward caching the content and the prediction error for the estimated probability that the mobile device will transition from the region to another region is inversely correlated with a second bias toward caching the content in which a lower prediction error for the estimated probability that the mobile device will transition from the region to another region increases a likelihood toward caching the content; and
      implementing the decision, comprising either caching or foregoing caching the content in accordance with the decision such that for the network device serving as a gateway upstream from an access point, the second bias has a magnitude that causes, for a given prediction error, the network device to more likely decide to cache the content than for the access point to cache the content.

19. The network device of claim 18, wherein the decision whether to cache the content at the network device is not based at least in part on whether other network devices in the network edge have cached the content.

20. A non-transitory computer-readable storage medium storing one or more programs configured for execution by a network device in a network edge, the one or more programs comprising instructions for:
   receiving, from an upstream network device, content directed to a mobile device attached to the network edge;
   making a decision whether to cache the content at the network device based at least in part on a popularity of the content in a region covered by the network device and a prediction error for an estimated probability that the mobile device will transition from the region to another region, wherein the popularity is directly correlated with a first bias toward caching the content and the prediction error for the estimated probability that the mobile device will transition from the region to another region is inversely correlated with a second bias toward caching the content in which a lower prediction error for the estimated probability that the mobile device will transition from the region to another region increases a likelihood toward caching the content; and
   implementing the decision, comprising either caching or foregoing caching the content at the network device in accordance with the decision such that for the network device serving as a gateway upstream from an access point, the second bias has a magnitude that causes, for a given prediction error, the network device to more likely decide to cache the content than for the access point to cache the content.

* * * * *